United States Patent [19]
Morton

[11] Patent Number: 5,321,797
[45] Date of Patent: Jun. 14, 1994

[54] APPARATUS AND METHOD FOR PERFORMING COORDINATE TRANSFORMATION EMPLOYING STORED VALUES AND INTERPOLATION

[75] Inventor: Roger R. A. Morton, Penfield, N.Y.

[73] Assignee: Eastman Kodak Company, Rochester, N.Y.

[21] Appl. No.: 535,696

[22] Filed: Jun. 11, 1990

[51] Int. Cl.⁵ .............................................. G06F 15/00
[52] U.S. Cl. .................................................... 395/131
[58] Field of Search ................... 395/127, 131; 358/80

[56] References Cited
U.S. PATENT DOCUMENTS

| | | | |
|---|---|---|---|
| 4,346,402 | 8/1982 | Pugsley | 358/80 |
| 4,477,833 | 10/1984 | Clark et al. | 358/80 |
| 4,839,721 | 6/1989 | Abdulwahab et al. | 358/80 |
| 5,063,375 | 11/1991 | Lien et al. | 340/703 |

Primary Examiner—Heather R. Herndon
Assistant Examiner—Michael Smith
Attorney, Agent, or Firm—Charles A. Wands

[57] ABSTRACT

A coordinate transformation method and apparatus that uses a lookup table to store a sample of transformed output values and an interpolator for interpolating between samples of the output values to provide an output data value. The samples are stored at varying sample spacings to accommodate varying curvatures of the transformation function so as to minimize interpolation errors.

20 Claims, 11 Drawing Sheets

APPARATUS AND METHOD FOR PERFORMING COORDINATE TRANSFORMATION EMPLOYING STORED VALUES AND INTERPOLATION

FIELD OF THE INVENTION

The invention relates to apparatus for performing nonlinear transformations on data values, such as color coordinate transformations on digital images, and more particularly to such apparatus wherein the transformations are performed by storing a sample of transformed values in a lookup table, and interpolating between the samples to produce a transformed value.

BACKGROUND OF THE INVENTION

Figure 2:
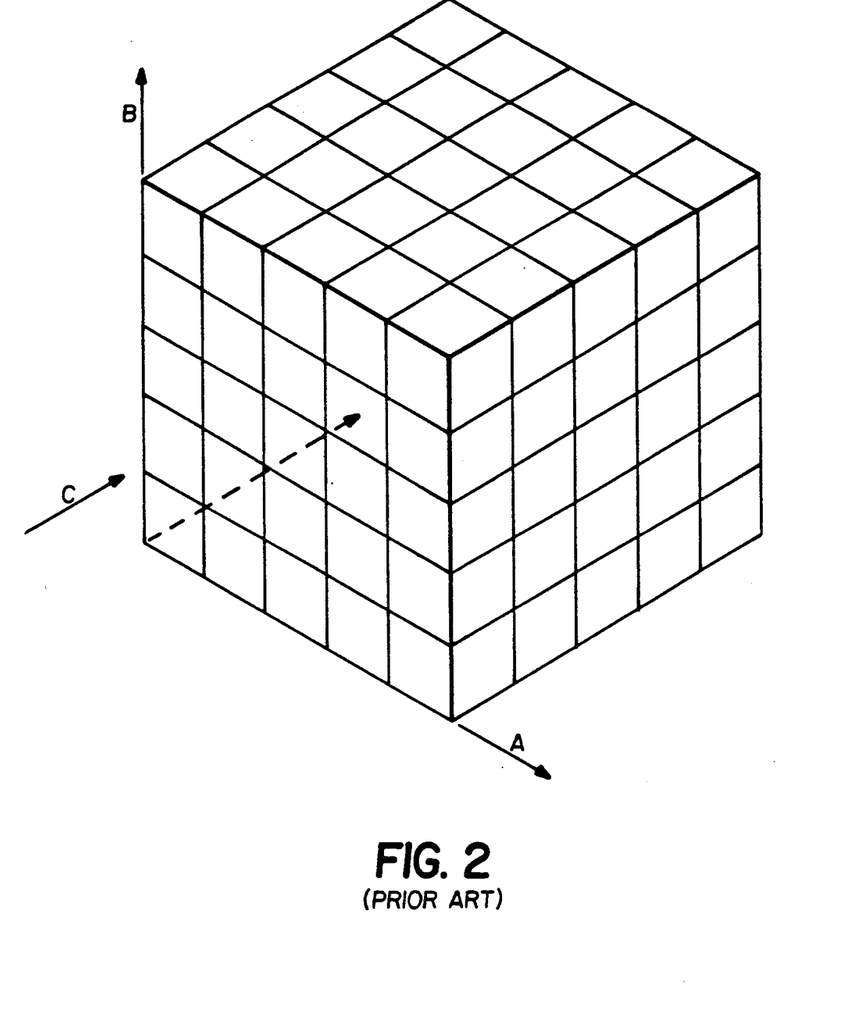
FIG. 2 is a diagram useful in describing the prior art apparatus for transforming a function of three variables.

In color image processing it is often required to transform color image signals from one color space such as R,G,B to another such as C,M,Y,K. This transformation is frequently performed by employing three or four dimensional lookup tables to transform electronic image data representing color images from one color space to another, and also to transform color data from an input device into a desired color representation for an output device. These tables consist of sparsely spaced data points regularly populating the three or four dimensional input color space and the output data is derived generally by performing a linear interpolation or signal dependent matrix operations on neighboring values over regularly defined regions within the input space. See for example U.S. Pat. No. 4,275,413, entitled "Linear Interpolation for Color Correction," issued Jun. 23, 1981 to Sakamoto, et al.; U.S. Pat. No. 4,511,989, "Linear Interpolating Method and Color Conversion Apparatus Using This Method," issued Apr. 16, 1985 to Sakamoto; and U.S. Pat. No. 4,346,402 "Image Reproduction Apparatus": issued Aug. 24, 1982 to Pugsley. Generally speaking, these regions in the input color space are defined by a list of points within a lookup table arranged in a manner to facilitate retrieval. As shown in FIG. 2, these points are samples on a three or four dimensional grid. FIG. 2 shows an example of the division of a three dimensional volume where the coordinate axis are labeled A, B and C and may represent for example R, G, B color components. This construction is, however, non-optimal because when a linear or matrix approximation technique is used for interpolation, error is introduced by the straight line approximation of the interpolation technique. The magnitude of the error is related to the local curvature on a slope of the transformation function. This error can become extreme near a color gamut boundary, in certain regions of the color space depending on the specific color transformation.

Figure 4:
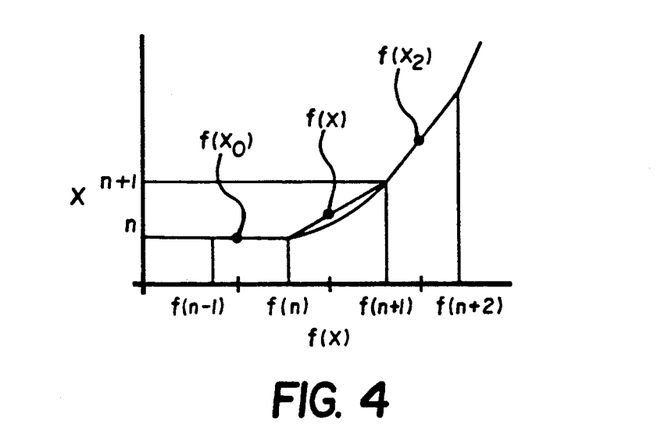
FIG. 4 is a graph showing a function of one variable having a high degree of curvature useful in describing the operation of the prior art transformation apparatus shown in FIG. 3.

To illustrate the problem, a function f(x) is shown in FIG. 4, having a high rate of curvature between the samples at n and n+1. The interpolated value f(x) between n and n+1 contains a large error, whereas the interpolated values $f(x_o)$ and $f(x_2)$ do not.

Figure 3:
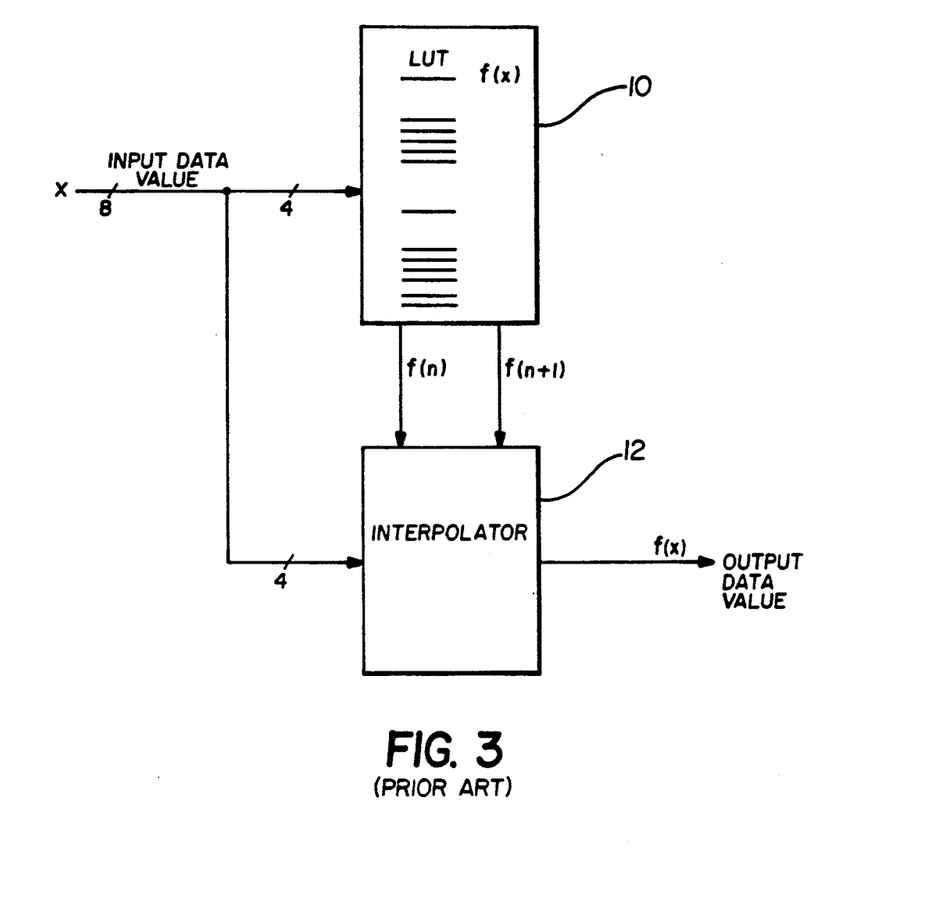
FIG. 3 is a schematic block diagram of prior art apparatus for transforming a function of one variable.

FIG. 3 is a schematic diagram illustrating this prior art technique for performing transformations on data. As shown in FIG. 3, lookup table 10 contains a regular sample of transformed data values f(x), The lookup table 10 and associated control logic is arranged to output a plurality of neighboring transformed values f(n) and f(n+1) where x is between n and n+1, in response to the high order bits of an input data value x. The transformed values f(n) and f(n+1) are supplied to an interpolator 12, along with the low order bits of the input data value. The interpolator 12 employs the low order bits as an interpolation factor F to interpolate a value f(x) between f(n) and f(n+1). Although the example in FIG. 3 is shown as a one dimensional interpolator for ease of description, the concept is readily extended to higher dimensions such as three dimensions for color image signals.

In an attempt to further reduce the size of the lookup table 10, for multidimensional data, such as color image data, it is known to perform a further transformation on each color component of the input image data prior to performing the color transformation to reduce the number of bits in the component data values. See U.S. Pat. No. 4,346,402 issued Aug. 24, 1982 to P. C. Pugsley. Also, for color image signals, special three dimensional interpolation algorithms have been proposed for increasing the efficiency of the interpolator 12. See for example U.S. Pat. No. 4,275,413 issued to Sakamoto et al., Jun. 23, 1981; U.S. Pat. No. 4,477,833 issued Oct. 16, 1984 to Clark et al,; and U.S. Pat. No. 4,511,989 issued Apr. 16, 1985 to Sakamoto.

All of these prior art approaches suffer from the shortcoming that in regions where the multi-dimensional transformation function exhibits a high curvature, the interpolation results in greater error. If this problem is remedied simply by sampling the output values at a higher frequency to reduce the error, the size of the lookup table memory holding the sample of output values is greatly increased, and therefore becomes prohibitively costly.

SUMMARY OF THE INVENTION

It is an object of the present invention to provide a coordinate transformation method and apparatus of the type employing a lookup table to store a sample of transformed output values and an interpolator for interpolating between samples of the output values to provide an output data value, that overcomes the shortcomings noted above.

The object is achieved according to the present invention by sampling the output values at varying sample spacings, selected to achieve a uniform magnitude of an error due to interpolation (which is related to the degree of curvature and shape of the transformation function), and storing the sample in a lookup table. When neighboring samples are retrieved from the lookup table for performing interpolation, an interpolation factor is produced that is both a function of the sampling frequency of the neighboring samples, and the relative location of the input data value between the input data values corresponding to the sample output data values. In this way, the interpolation error can be minimized without unnecessarily increasing the storage size of the lookup table.

Coordinate transformation apparatus according to the present invention can be employed in color digital imaging processing apparatus and is advantageous in that a more efficient utilization of memory is achieved, and interpolation accuracy in areas where the interpolation error would otherwise be large due to curvature of the function.

In a preferred mode of practicing the invention, the digital data represents a color digital image, and the transformation represents a multi-dimensional color coordinate transformation.

DETAILED DESCRIPTION

Figure 1:
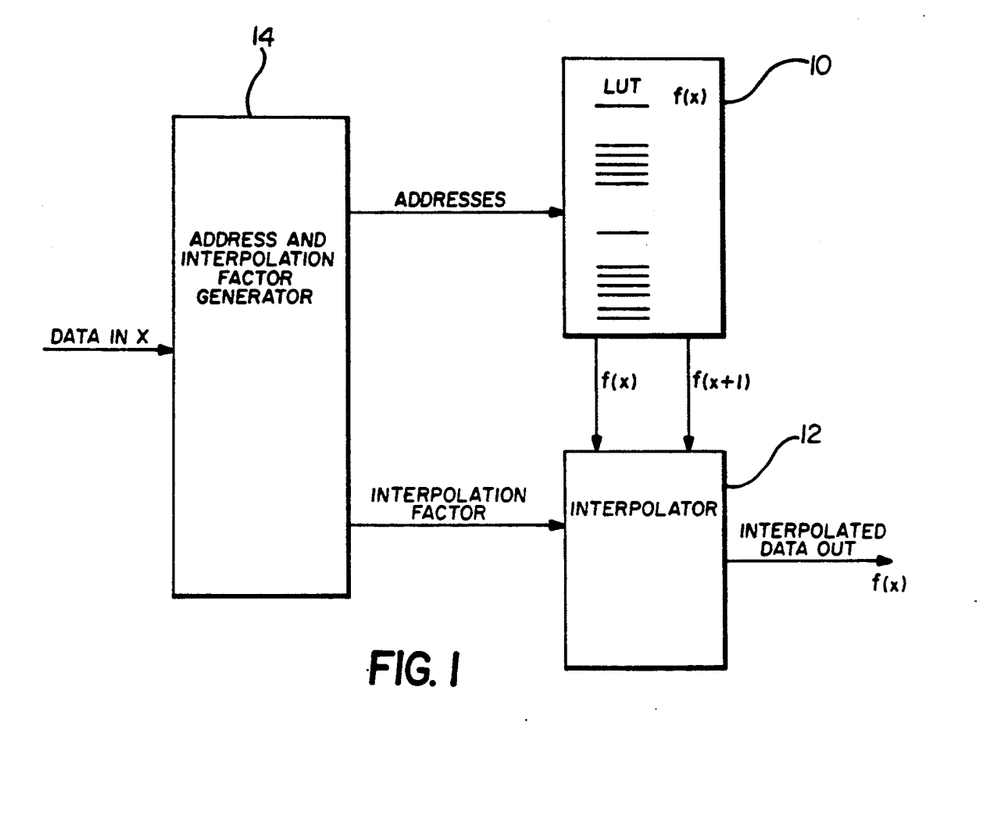
FIG. 1 is a schematic block diagram of transformation apparatus according to the present invention for transforming a function of one variable.
Figure 5:
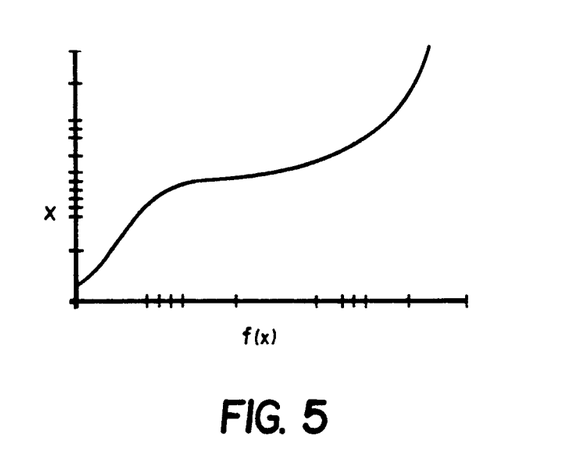
FIG. 5 is a graph of a function of one variable having two regions of high curvature useful in describing the operation of the transformation apparatus shown in FIG. 1.
Figure 6:
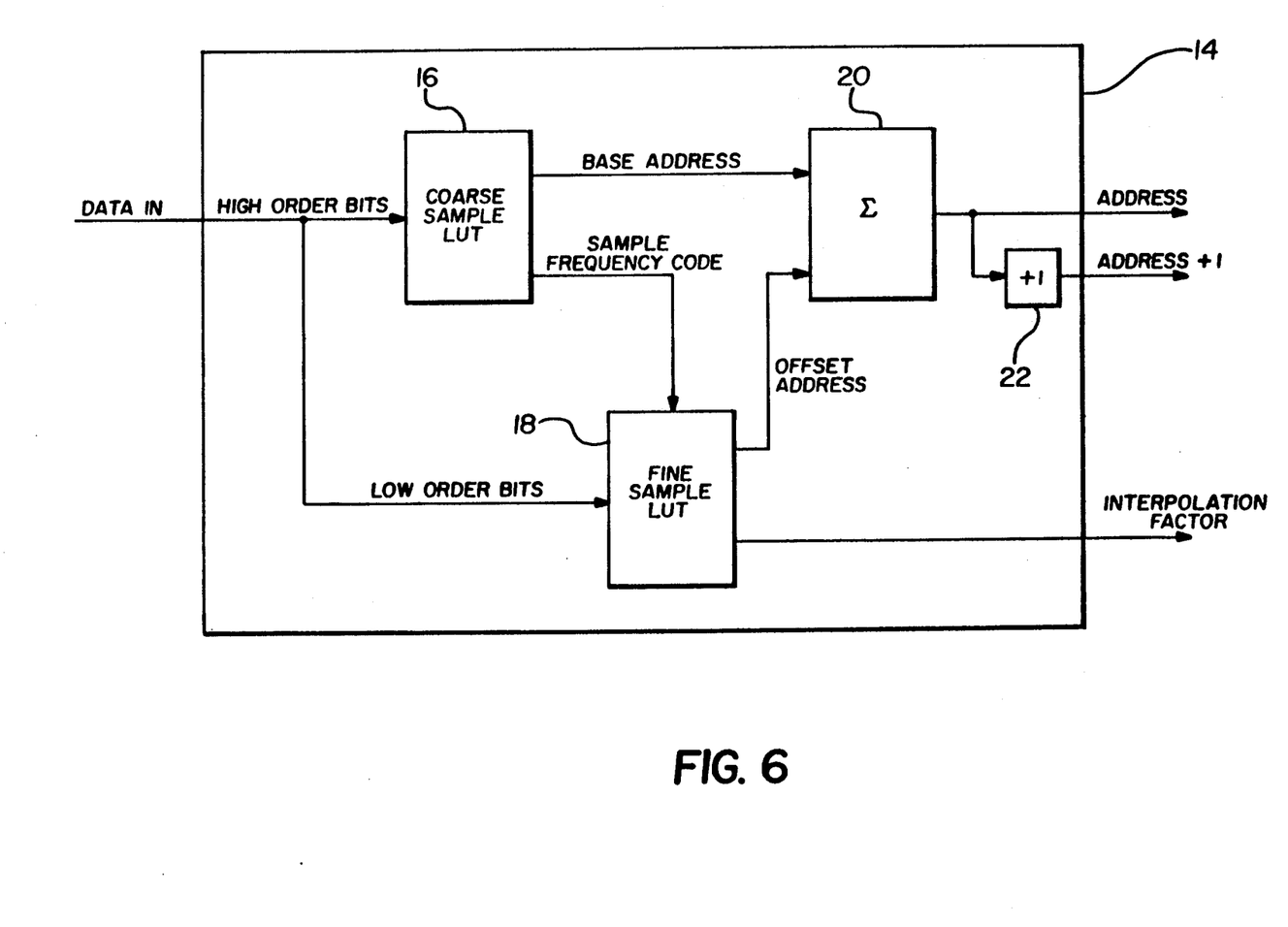
FIG. 6 is a schematic block diagram of the address and interpolation factor generator shown in FIG. 1.

The principle of operation of the present invention is illustrated in FIG. 1, which shows an example for transforming one dimensional data. A nonlinear function f(x) having two regions of high curvature is shown in FIG. 5. The function f(x) is sampled at a higher frequency in the regions of high curvature as shown by the sampling locations marked on the axes. The sampled values of f(x) are stored in the lookup table 10 (see FIG. 1). Since the sampled output values are not taken on a regular spacing, as in the prior art, there is not a one-to-one correspondence between the high order bits of the input data and the addresses of the output data in the lookup table 10. Furthermore, since the spacing between output values is not fixed, the interpolation factor is not simply the lower order bits of the input data. To generate the correct address for the lookup table 10, and the appropriate interpolation factor for the interpolator 12, an address and interpolation factor generator 14 is provided. The address and interpolation factor generator 14 contains information about the sampling frequency of the function f(x) and the scheme for storing the samples of f(x) in lookup table 10, and generates the address and interpolation coefficient accordingly. FIG. 6 shows an example of how this is accomplished. For this example, two sampling rates are employed, coarse and fine, and between any two coarse samples, the function is either sampled at the fine rate or it is not. The address and interpolation factor generator 14 comprises a coarse sample lookup table 16, a fine sample lookup table 18, and a summer 20. The sampled values of f(x) are addressed in the lookup table 10 according to the scheme shown in Table 1 below:

TABLE 1

| ADDRESS | LOOKUP TABLE VALUE F(X) CONTENTS |
|---|---|
| 1 | |
| 2 | |
| 3 | coarse sample values |
| . | |
| . | |
| n | |
| n+1 | fine sample values in a first finely sampled region |
| . | |
| . | |
| n + m$_1$ | |
| n + m$_1$ + 1 | fine sample values in a second finely sample region |
| . | |
| . | |
| n + m$_2$ | |
| . | The base address and the sampling frequency codes are stored in the coarse sample lookup table 16 as shown in Table 2: |

TABLE 2

| Input Value | Sampling Base Address | Frequency Code |
|---|---|---|
| 1 | 1 | Coarse |
| 2 | 2 | Coarse |
| . | . | . |
| x | n + 1 | Fine Size m$_1$ |
| . | . | . |
| . | . | . |
| 5 | 5 | Coarse |
| . | . | . |
| y | nm$_1$ + 1 | Fine Size m$_2$ |
| . | . | . |

The data input values to the coarse sample lookup table 16 are the high order bits of the input data word.

The fine sample lookup table 18 receives the low order bits of the input data word, and supplies an offset address and an interpolation factor.

When the coarse sample lookup table 16 indicates that there is no fine sampling in the interval, the address offset is zero, and the interpolation factor is proportional to the input value (i.e. the least significant bits of the input data value). When fine sampling occurs in the interval, the address offset is proportional to the ratio of the input value n to the sampling rate S in the interval. For example, if the input value could take on 32 possible values in the interval, and the fine sampling occurred at a rate of 8 samples on the interval, the address offset would be the integer portion of n divided by 8. Similarly, the interpolation factor cycles between zero and N/S, S times in the interval. The address for lookup table 10 is produced in summer 20 by adding the base address from the coarse sample lookup table 16 and the address offset from the fine sample lookup table 18. Since the interpolator 12 requires 2 interpolation values to perform the interpolation, means 22 are provided for incrementing the address by one and sending the incremented address value to the lookup table 10. Alternatively, the lookup table 10 can be structured to automatically provide both values at the current address, and the next address. See for example U.S. patent application No. 385,242 entitled "System for Performing Linear Interpolation," filed Jul. 25, 1989 by Newman et al. which is incorporated herein by reference.

The interpolation factor and the two output values from lookup table 10 are then employed to produce an interpolated value in a known manner, for example according to a well known linear interpolation formula:

$$f(x) = [f(n) \cdot F_i] + [f(n+1) \cdot (1 - F_i)], \quad (1)$$

where f(x) is the interpolated value, f(n) and f(n+1) are successive stored values, and $F_i$ is the interpolation factor which lies between 0 and 1.

In the preferred embodiment of the invention, the transformation apparatus is employed to perform transformations on functions of three or four variables. The technique effectively divides the multidimensional input space into variable sized regions as shown schematically in FIG. 7. In regions where the transformation function has a high rate of curvature, such as in the regions labeled 30 and 32, the sampling rate is higher and in regions where the function changes less rapidly, the sampling rate is lower, thereby maximizing the storage efficiency of the transformation function lookup table.

Figure 8:
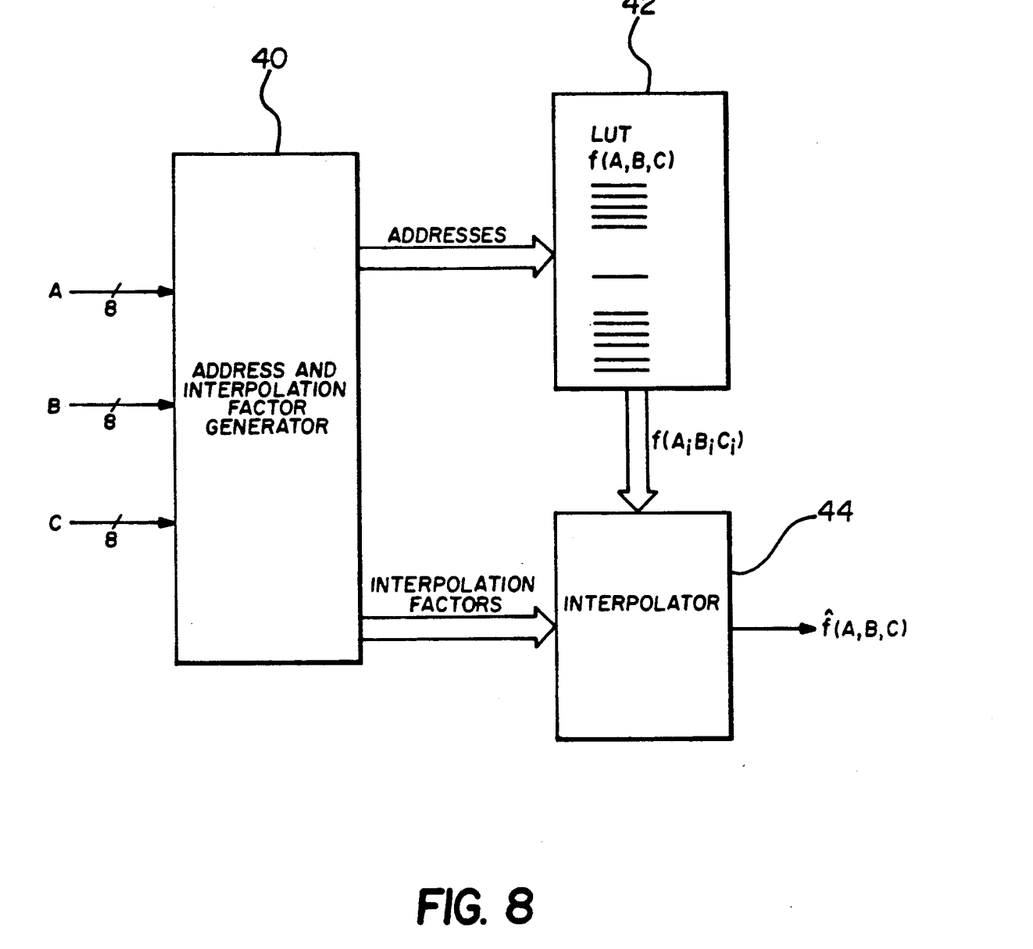
FIG. 8 is a schematic block diagram of a preferred embodiment of the apparatus according to the present invention for performing a transformation on a function of three variables.

Referring now to FIG. 8, apparatus will be described for performing a transformation that is a function of three variables A, B, and C. Three variables represent, for example, three color components such as R, G, and B to produce an output value f(A,B,C) that may for example represent the cyan component of a CMY color space. The other color components M and Y could be produced simultaneously in similar apparatus, or could be produced sequentially from the same apparatus by changing the values stored in the lookup tables.

Figure 9:
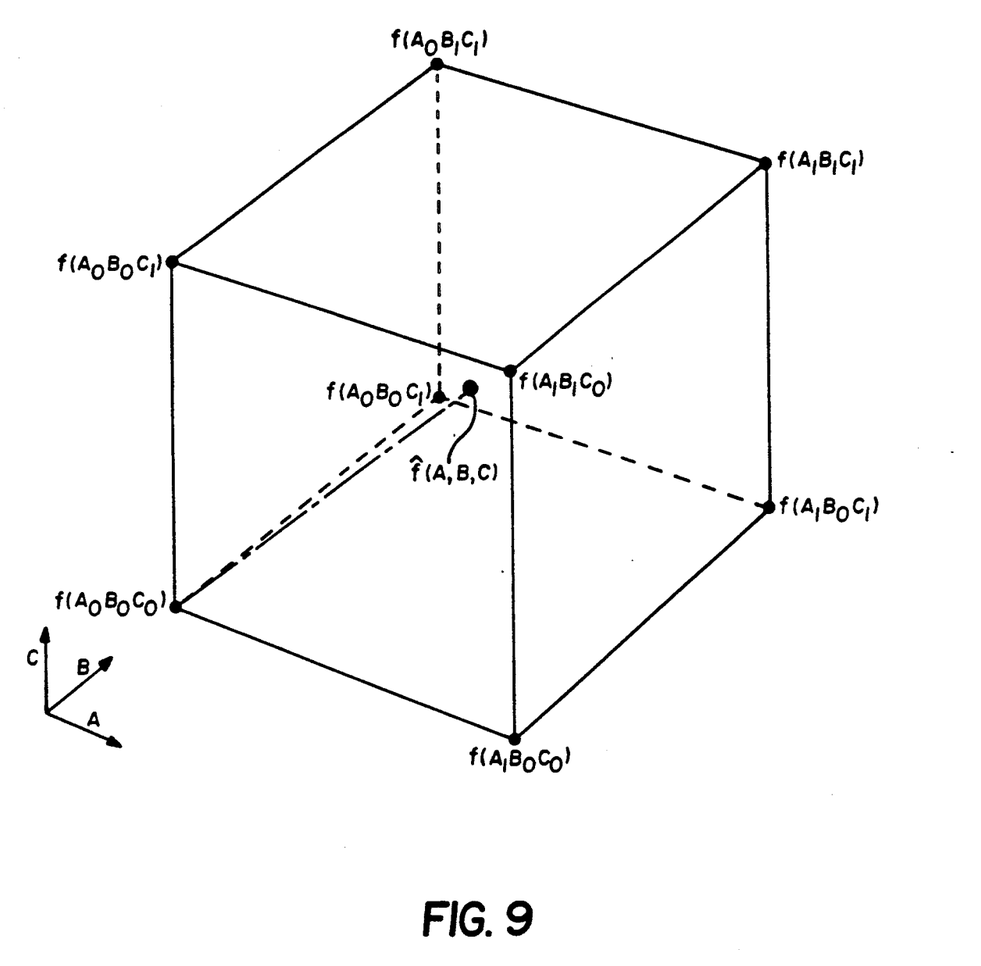
FIG. 9 is a diagram useful in describing the operation of the apparatus in FIG. 8.

The three input values A, B, and C, represented, for example, by 8-bit digital words are supplied to the address and interpolation factor generator 40. For a three variable transformation function, eight interpolation values $f(A_iB_iC_i)$ are required. As shown in FIG. 9, these eight values lie at the eight corners of a cube in the three dimensional input data space.

To retrieve these eight values from the lookup table 42, eight addresses are generated by the address and interpolation factor generator 40 and sent to the lookup table 42. In response to the eight addresses, the lookup table 42 supplies eight interpolation values $f(A_iB_iC_i)$ where i=0,1 to the interpolator 44. Alternatively, the lookup table 42 can be structured to automatically provide all eight values in response to the input value $A_0B_0C_0$ as shown in the above referenced U.S. patent application Ser. No. 385,242. The address and interpolation factor generator 40 also supplies three interpolation factors $F_A, F_B, F_C$ for performing the three dimensional linear interpolation between the eight values. The transformed value samples are stored in the lookup table 42 in the order shown in table 4.

TABLE 4

| | |
|---|---|
| 0 | |
| 1 | |
| 2 | 8 × 8 × 8 coarse samples |
| . | |

TABLE 4-continued

| | |
|---|---|
| 511 | |
| 512 | |
| . | 8 × 8 × 4 fine sampled region |
| . | |
| 767 | |
| 768 | |
| . | 4 × 8 × 16 fine sampled region |
| . | |
| 1023 | |
| 1024 | |
| . | 4 × 4 × 4 fine sampled region |
| . | |
| 1087 | |

Figure 7:
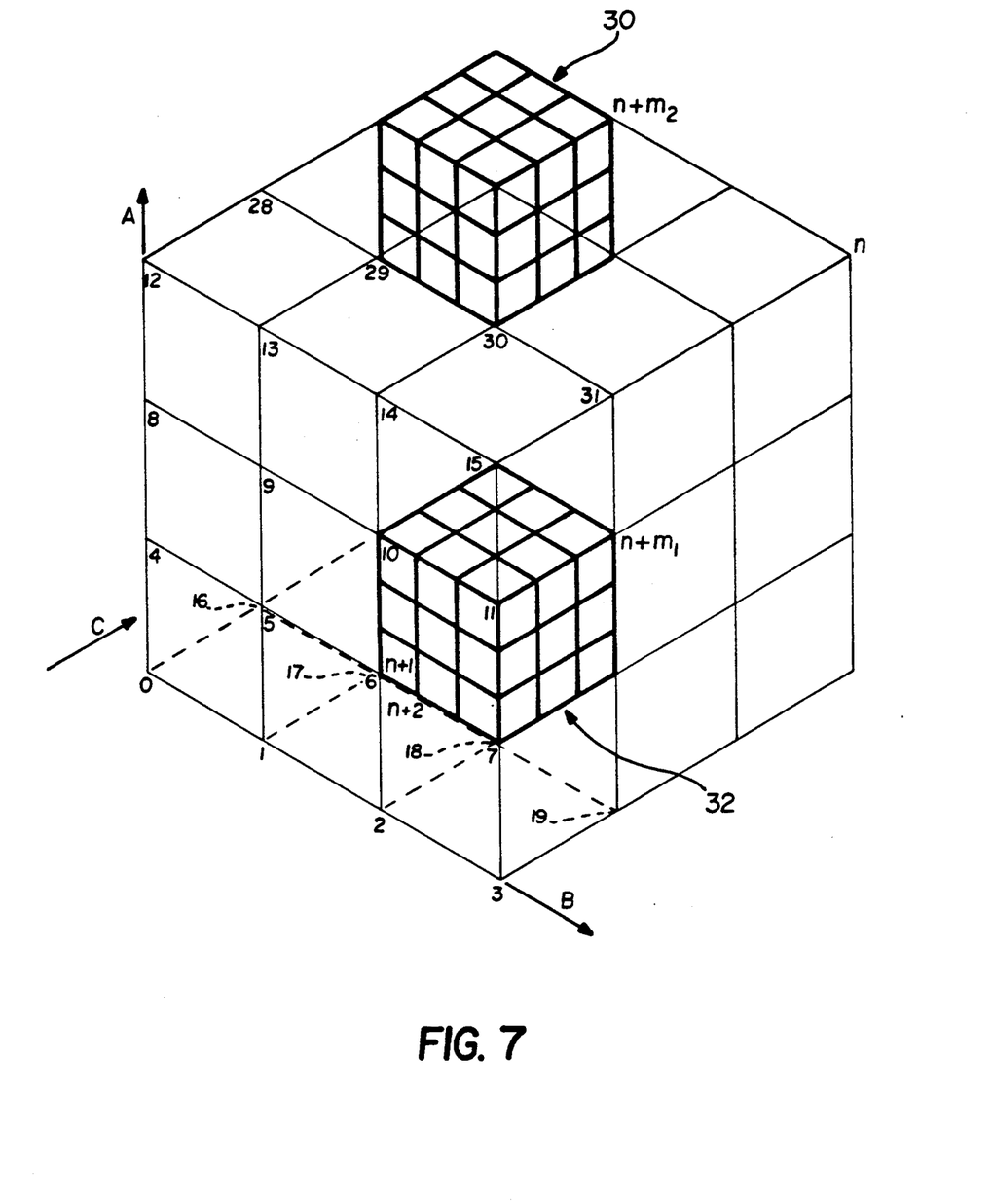
FIG. 7 is a graph of a three dimension input space useful in describing the operation of a preferred embodiment of the apparatus according to the present invention.

For the example shown in table 4, the input data space is coarsely divided into 8×8×8 samples. Three of the regions in the sample space are further subsampled. A first region is subsampled in 8×8×4 fine samples. A second region is subsampled into 4×8×16 subsamples, and a third region is subsampled with 4×4×4 fine samples. The sample values are outlined in the table by listing the sample along the A axis, incrementing B by one, and listing the samples along the A axis etc. as shown in FIG. 7. After a first layer of samples is listed from an AB plane, C's incremented by one and the next layer is listed.

The interpolator 44 receives the eight transformed values $f(A_iB_iC_i)$ from the lookup table 42 and the interpolation factors $F_A$ $F_B$ and $F_C$ from the address and interpolation factor generator 40, and generates an interpolated value f(A,B,C) using some form of three dimensional linear interpolation. It should be noted that three dimensional linear interpolation is not a well defined operation, and different approaches will produce slightly different values. The particular method of three dimension interpolation employed with the present invention is not a critical aspect of the present invention. A straight forward trilinear interpolation can be performed as follows:

$$\begin{aligned}
f(A,B,C) = \; & f(A_0B_0C_0) \cdot (1-F_A)(1-F_B)(1-F_C) + \\
& f(A_1B_0C_0) \cdot F_A(1-F_B)(1-F_C) + \\
& f(A_0B_1C_0) \cdot (1-F_A) \cdot F_B \cdot (1-F_C) + \\
& f(A_0B_0C_1) \cdot (1-F_A) \cdot (1-F_B) \cdot F_B + \\
& f(A_0B_1C_1) \cdot (1-F_A) \cdot F_B \cdot F_C \, (2) + \\
& f(A_1B_0C_1) \cdot F_A \cdot (1-F_B) \cdot F_B + \\
& f(A_1B_1C_0) \cdot F_A \cdot F_B \cdot (1-F_C) + \\
& f(A_1B_1C_1) \cdot F_A \cdot F_B \cdot F_C,
\end{aligned}$$

where f(A,B,C) is the interpolated value, $f(A_iB_iC_i)$ are the eight values at the corners of the cube shown in FIG. 9, and $F_A$ $F_B$ and $F_C$ are the interpolation factors in directions A B & C respectively and these factors lie between 0 and 1.

Alternatively, improved multidimensional linear interpolation methods requiring fewer multiplications or providing greater interpolation accuracy, such as that disclosed in U.S. Pat. No. 4,275,413 issued Jun. 23, 1981 to Sakamoto et al. (which is incorporated herein by reference) may be employed.

Figure 10:
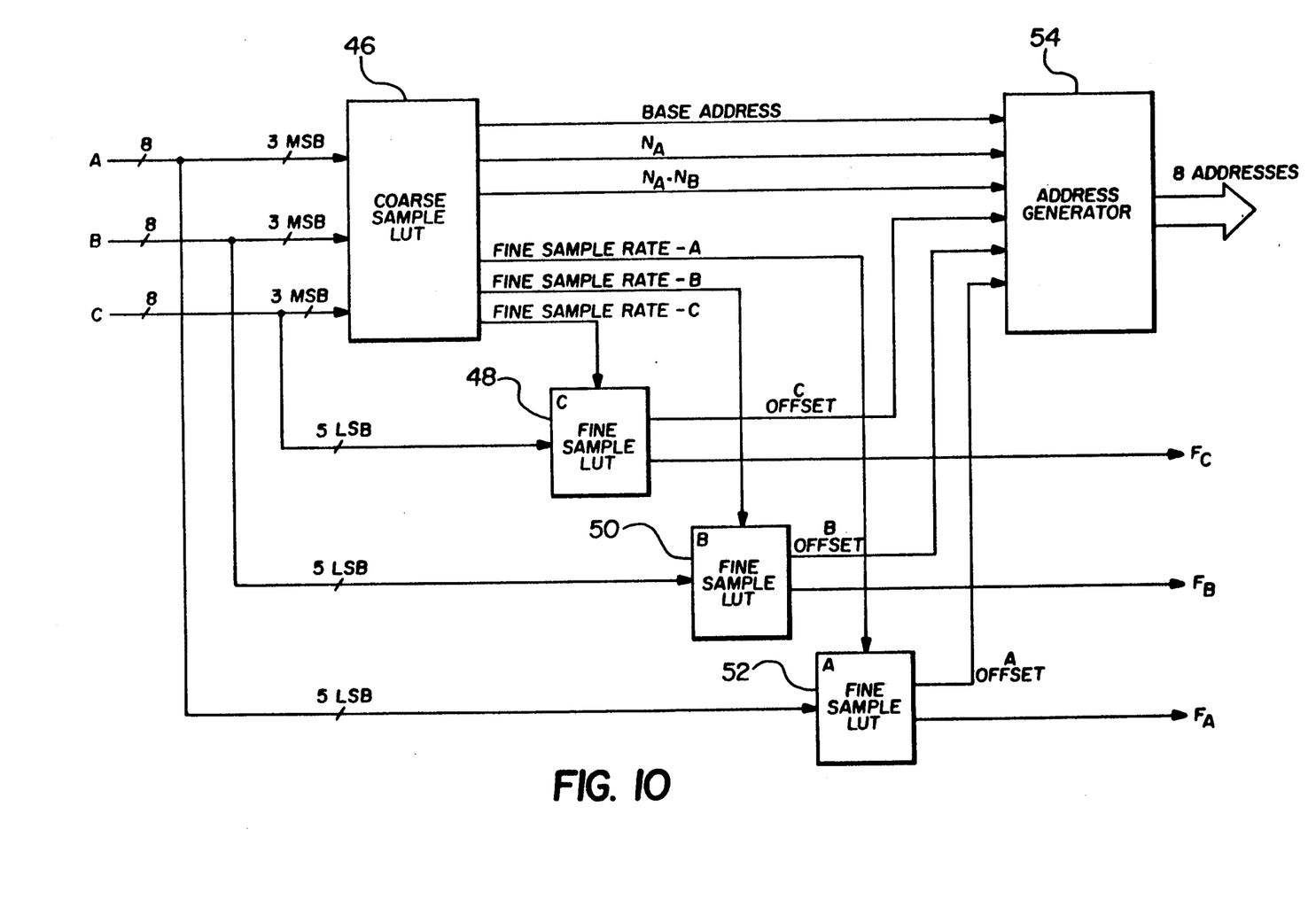
FIG. 10 is a schematic diagram showing the address and interpolation factor generator of FIG. 8 in further detail.

The address and interpolation factor generator 40 will now be described in further detail with reference to FIG. 10. The address and interpolation factor generator 40 includes a coarse sample lookup table 46 and fine sample lookup tables 48, 50 and 52, one fine sample lookup table for each component of the input data.

The coarse sample lookup table 46 receives the three most significant bits from each of the three components of the input data values A, B, and C, and employs the 9 bits to address a lookup table that contains for each possible 9 bit address location the following information:

1. a base address corresponding to table 42 of the coarse sample located at the corner of a course region nearest the origin in the sample space in which the input data lies. If the course region is not subsampled, the base address is in the coarse sample portion of the lookup table shown in table 4 that is stored in lookup table 42. If the region is subsampled, the base address is the first value in the lookup table that represents the subsampled region of the course region.

2. A value $N_A$ representing the number of samples along the A axis. If the course region is not subsampled, $N_A$ is the total number of coarse samples along the axis (e.g. 8). If the course region is subsampled, $N_A$ is the total number of fine samples along the A axis in the subsampled region (e.g. 2,4,8 etc.).

3. A value $N_A.N_B$ representing the product of the number of samples along the A axis times the number of samples along the B axis. If the region is not subsampled, $N_A.N_B$ is the product of the total number of samples along the A axis and the B axis (e.g. 64). If the region is subsampled, $N_A.N_B$ is the total number of fine samples along the A axis times the number along the B axis (e.g. 4,16,64 etc.) within a course region; and 4. Codes representing the subsampling rates along the A,B, and C axis across the course region.

The base address and the values $N_A$ and $N_A.N_B$ are supplied to the address generator 54, and the sample rate codes are supplied to the fine sample lookup tables 48, 50, and 52.

Table 5 shows an example of the data stored in the coarse sample lookup table 46 corresponding to the lookup table data depicted in table 4.

TABLE 5

| Input Value | Base Address | $N_A$ | $N_A.N_B$ | Sample Rate Code A | B | C |
|---|---|---|---|---|---|---|
| 0 | 0 | 8 | 64 | 0 | 0 | 0 |
| . | | | | | | |
| . | | | | | | |
| . | | | | | | |
| 60 | 512 | 8 | 64 | 2 | 2 | 1 |
| 61 | 61 | 8 | 64 | 0 | 0 | 0 |
| . | | | | | | |
| . | | | | | | |
| 136 | 768 | 4 | 32 | 1 | 2 | 3 |
| 137 | 137 | 8 | 64 | 0 | 0 | 0 |
| . | | | | | | |
| . | | | | | | |
| 460 | 1024 | 4 | 16 | 1 | 1 | 1 |
| 461 | 461 | 8 | 64 | 0 | 0 | 0 |
| . | | | | | | |
| . | | | | | | | where sample rate code
0 = not subsampled
1 = 4 samples
2 = 8 samples
3 = 16 samples As seen in table 5, for the first value in the table, the region is not subsampled, and the base address is the same as the input value. $N_A$ is 8 since the overall space is coarse sampled in an 8×8×8 pattern. Similarly $N_A.N_B = 64$. At input value 60, the region is subsampled in an 8×8×4 pattern. Since this is the first subsampled region, the base address is 512, which is the next address following the coarse sample portion of the lookup table. For the following sample (input value is 61) the region is not subsampled, so again the base address is the same as the input address.

The respective fine sample rates are supplied to the fine sampled lookup tables 48, 50, and 52, which produce in response to the least significant bits of the respective data values, an offset value, and an interpolation constant. Table 6 shows an example of the data stored in one of the fine sample lookup tables note that all three tables 48, 50, and 52 are identical. It should also be noted that when the transformation function f(A,B,C) is changed, for example to produce a different color function, the values in tables 48, 50, and 52 are not affected.

TABLE 6

Fine Sample Rate

| Input Value | Off-set | 1... Interp. Factor | Off-set | 4... Interp. Factor | Off-set | 8... Interp. Factor | Off-set | 16 Interp. Factor |
|---|---|---|---|---|---|---|---|---|
| 0 | 0 | 0 | 0 | 0 | 0 | 0 | 0 | 0 |
| 1 | 0 | 1/32 | 0 | ⅛ | 0 | ¼ | 0 | ½ |
| 2 | 0 | 2/32 | 0 | 2/8 | 0 | 2/4 | 1 | 0 |
| 3 | 0 | 3/32 | 0 | ⅜ | 0 | ¾ | 1 | ½ |
| 4 | 0 | 4/32 | 0 | 4/8 | 1 | 0 | 2 | 0 |
| 5 | 0 | 5/32 | 0 | ⅝ | 1 | ¼ | 2 | ½ |
| 6 | 0 | 6/32 | 0 | 6/8 | 1 | 2/4 | 3 | 0 |
| 7 | 0 | 7/32 | 0 | ⅞ | 1 | ¾ | 3 | ½ |
| 8 | 0 | 8/32 | 1 | 0 | 2 | 0 | 4 | 0 |
| 9 | 0 | 9/32 | 1 | ⅛ | 2 | ¼ | 4 | ½ |
| 10 | 0 | 10/32 | 1 | 2/8 | 2 | 2/4 | 5 | 0 |
| 11 | 0 | 11/32 | 1 | ⅜ | 2 | ¾ | 5 | ½ |
| 12 | 0 | 12/32 | 1 | 4/8 | 3 | 0 | 6 | 0 |
| 13 | 0 | 13/32 | 1 | ⅝ | 3 | ¼ | 6 | ½ |
| 14 | 0 | 14/32 | 1 | 6/8 | 3 | 2/4 | 7 | 0 |
| 15 | 0 | 15/32 | 1 | ⅞ | 3 | ¾ | 7 | ½ |
| 16 | 0 | 16/32 | 2 | 0 | 4 | 0 | 8 | 0 |
| 17 | 0 | 17/32 | 2 | ⅛ | 4 | ¼ | 8 | ½ |
| 18 | 0 | 18/32 | 2 | 2/8 | 4 | 2/4 | 9 | 0 |
| 19 | 0 | 19/32 | 2 | ⅜ | 4 | ¾ | 9 | ½ |
| 20 | 0 | 20/23 | 2 | 4/8 | 5 | 0 | 10 | 0 |
| 21 | 0 | 21/32 | 2 | ⅝ | 5 | ¼ | 10 | ½ |
| 22 | 0 | 22/32 | 2 | 6/8 | 5 | 2/4 | 11 | 0 |
| 23 | 0 | 23/32 | 2 | ⅞ | 5 | ¾ | 11 | ½ |
| 24 | 0 | 24/32 | 3 | 0 | 6 | 0 | 12 | 0 |
| 25 | 0 | 25/32 | 3 | ⅛ | 6 | ¼ | 12 | ½ |
| 26 | 0 | 26/32 | 3 | 2/8 | 6 | 2/4 | 13 | 0 |
| 27 | 0 | 27/32 | 3 | ⅜ | 6 | ¾ | 13 | ½ |
| 28 | 0 | 28/32 | 3 | 4/8 | 7 | 0 | 14 | 0 |
| 29 | 0 | 29/32 | 3 | ⅝ | 7 | ¼ | 14 | ½ |
| 30 | 0 | 30/32 | 3 | 6/8 | 7 | 2/4 | 15 | 0 |
| 31 | 0 | 31/32 | 3 | ⅞ | 7 | ¾ | 15 | ½ |

As shown previously in table 6, when the region is not subsampled (fine sample rate=1) the offset value is zero, and the interpolation factor is directly proportional to the input value. When the fine sample rate is 4 fine samples per coarse sample, the offset is incremented each time the input value increases by eight, and the interpolation factor cycles from ⅛ to ⅞. As the sample rate increases, the offset increments over shorter intervals, and the interpolation factor cycles over shorter intervals as shown for sample rates 8 and 16. The interpolation values or terms 160, 161 and 162 are sent to the interpolation unit.

The operation of the address generator 54 will now be described in further detail with reference to FIG. 11 and 12.

Figure 11:
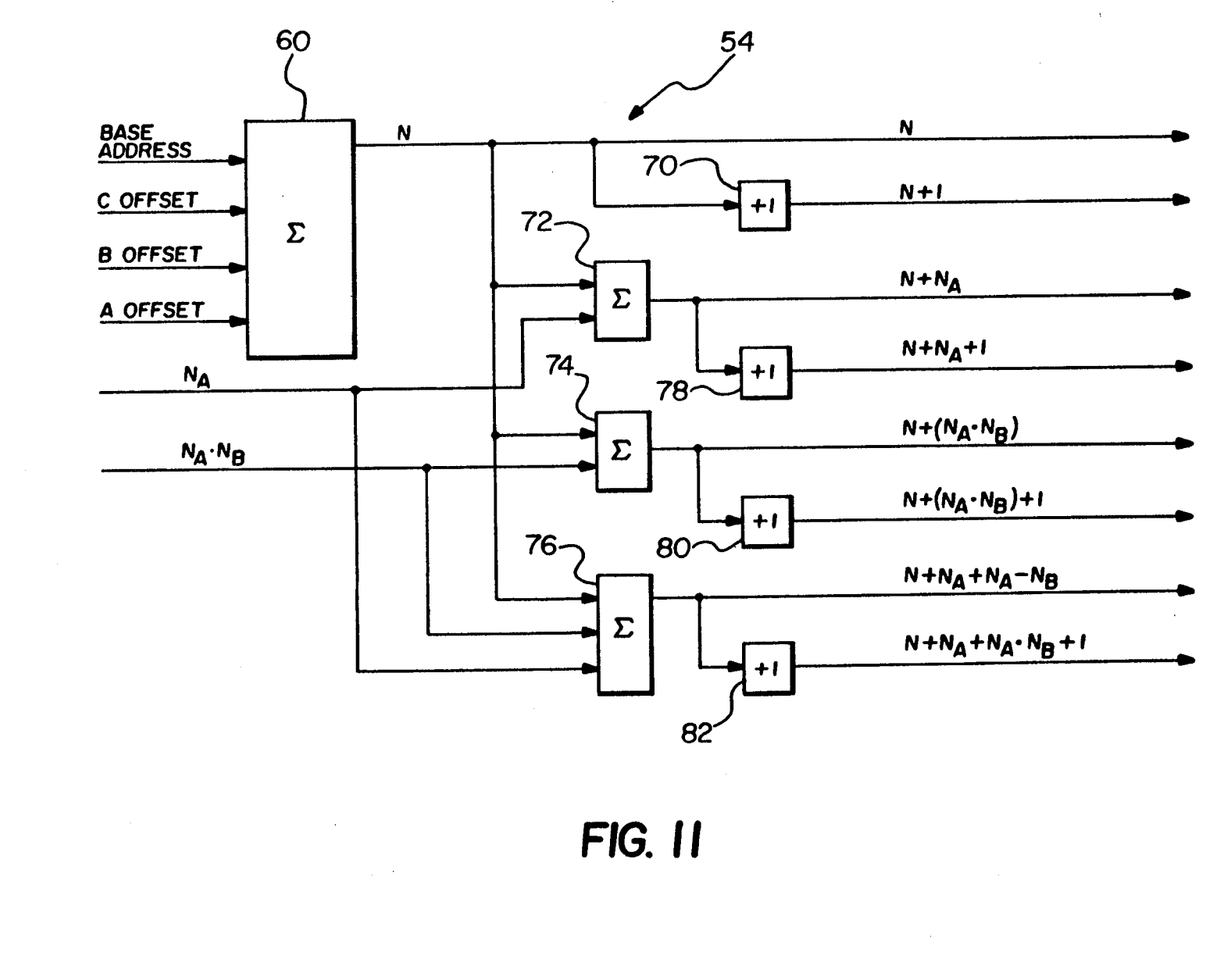
FIG. 11 is a schematic diagram showing the address generator of FIG. 10 in further detail.
Figure 12:
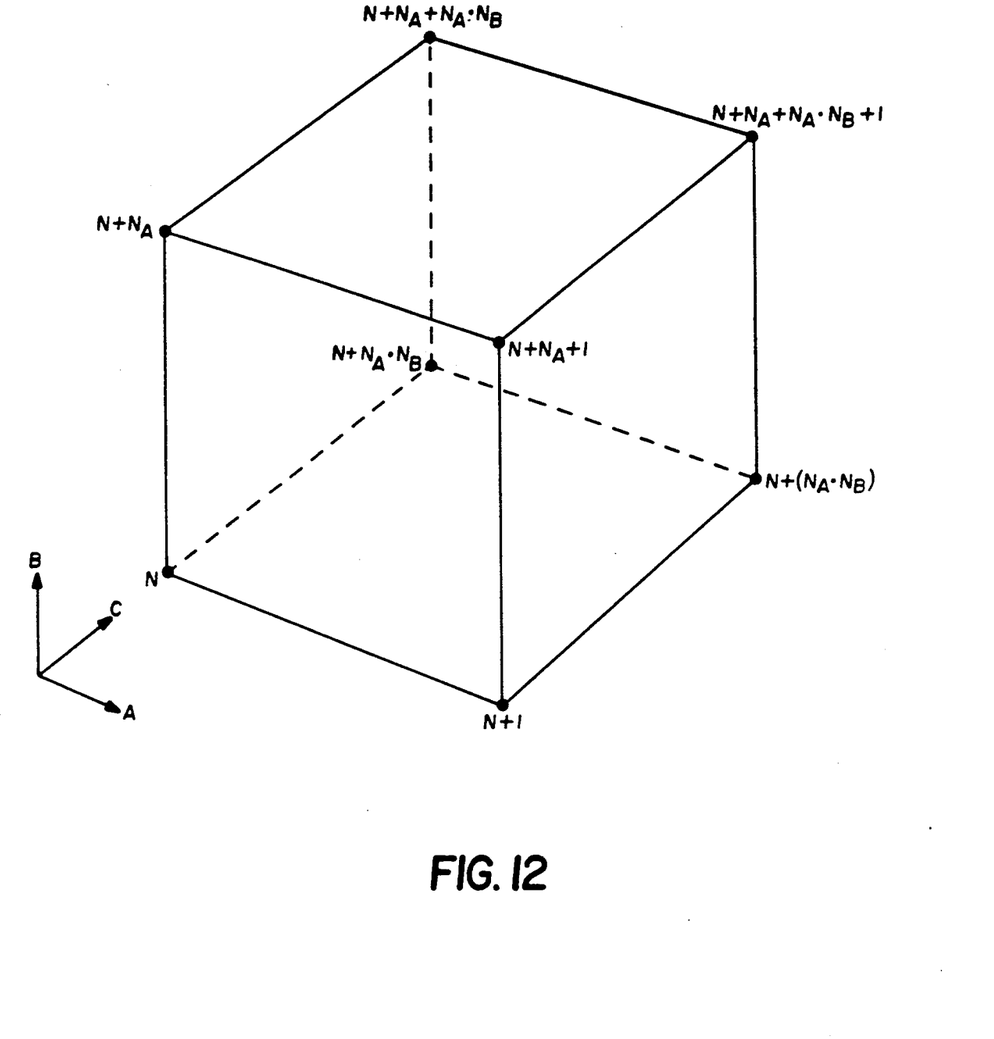
FIG. 12 is a diagram useful in describing the operation of the address generator of FIG. 11.

Referring first to FIG. 12, there is shown a three dimensional region in A, B, C space similar to that shown in FIG. 9. Although the region is shown as a generally cubic region for the sake of example, the sides of the A, B, and C directions will generally be unequal, unless the sample rates in each of these directions are equal and the course region encompassing the fine region is equal on all sides. A sample point N, represents the closest sample point to the origin. The other seven sample points employed in the interpolation are labelled in FIG. 12 according to their location in the lookup table 42. The purpose of the address generator 54 is to produce the addresses as shown in FIG. 12. Referring now to FIG. 11, the address generator 54 includes a first summing circuit 60 that receives the base address and the three offsets from the A, B, and C fine sample lookup tables and produces the lookup table address for the sample N. The bits of the offset values from the fine sample lookup tables are sequentially interleaved to form an addend. That is, if the offset values are four bit values $A_1A_2A_3A_4$; $B_1B_2B_3B_4$; $C_1C_2C_3C_4$, the least significant bit of the A offset is the least significant bit of the addend, the least significant bit of the B offset is the next last significant bit, and so on, so that the bit assignment of the offset addend supplied to the summing circuit 60 is $C_1B_1A_1C_2B_2A_2C_3B_3A_3C_4B_4A_4$. This value is added to the base address by the summing circuit 60 to produce the address of the value N located at the corner of an interpolation region. It is to be noted that this addressing scheme is subject to the constraint that there must be equal to or more than the number of subsamples along the A axis than along the B or C axis, and similarly there must be equal to or more than the number of subsamples along the B axis than along the C axis. If this constraint is not respected, the addresses of the lookup table 42 will not all be utilized, thereby wasting memory space.

Alternatively, to avoid this constraint, means can be provided for making the offset calculation:

$$\text{offset} = N_0 + (C_0 \cdot N_A \cdot N_B) + (B_0 \cdot N_A) + A_0, \quad (3)$$

where $N_0$ is the base address offset value, $C_0$ is the offset value along the C axis, $B_0$ is the offset value along the B axis, $A_0$ is the offset value along the A axis, $N_A$ is the number of subsamples along the A axis, and $N_B$ is the number of subsamples along the B axis.

Figure 13:
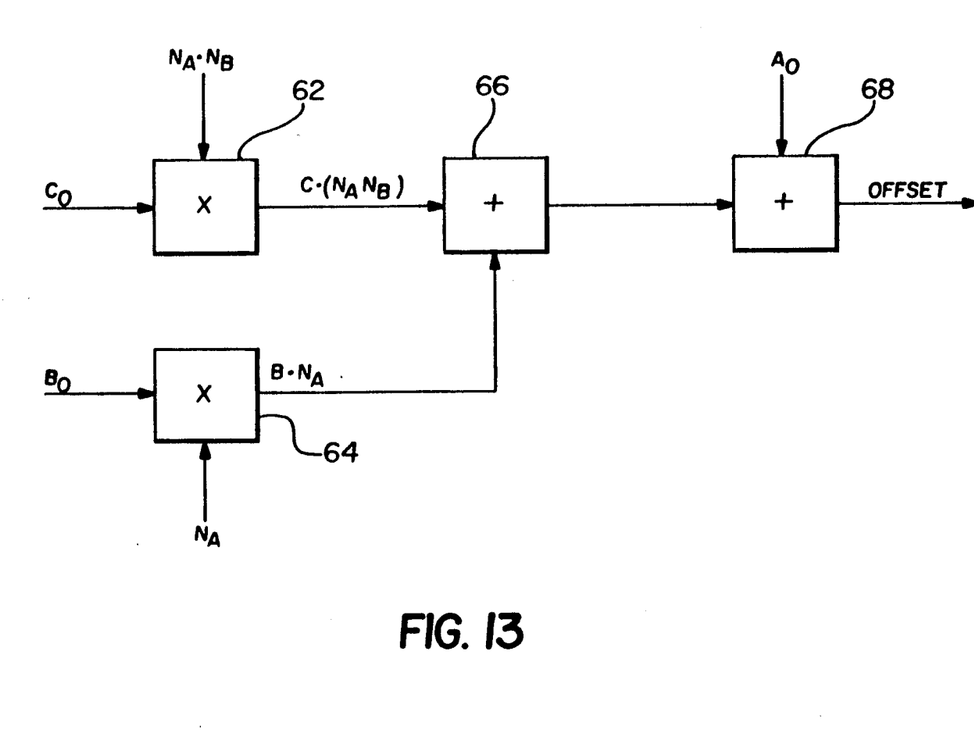
FIG. 13 is a schematic diagram illustrating an alternative embodiment of a portion of the address and interpolation factor generator shown in FIG. 10.

FIG. 13 shows an arrangement for generating the offset value according to equation 3. In this arrangement, the product of the C offset value $C_0$ from the C fine sample lookup table 48, and the quantity $N_A \cdot N_B$ from the coarse sample lookup table 46 are taken in a multiplier 62. The product of the B offset value $B_0$ from the B fine sample lookup table 50 and the quantity $N_A$ from the coarse sample lookup table 46 are taken in a multiplier 64. The products from the multipliers 62 and 64 are added in an adder 66, and the A offset value $A_0$ from the fine sample lookup table 52 is added to the sum in adder 68 to produce the final offset value. The final offset value is then supplied to the summer 60 in the address generator to produce the address value N.

As shown in FIG. 11, the value N is incremented by one in adder 70 to produce the address value N+1. The address value $N+N_A$ is produced by adding the value N from summer 60 to the value $N_A$ from the coarse sample lookup table 46 in summer 42. Similarly, the address value $N+(N_A \cdot N_B)$ is produced by summer 74 and the address $N+N_A+N_A \cdot N_B$ is produced by summer 76. Each of the values from summers 72, 74, and 76 is likewise incremented by one in adders 78, 80, and 82 respectively to provide the addresses shown in FIG. 11.

The eight addresses produced by the address generator 54 are applied to the lookup table 42 to produce the interpolation values for interpolator 44 (see FIG. 8).

The invention has been described with reference to preferred embodiments thereof; however it will be appreciated that extensions and modifications can be made within the spirit and scope of the invention. For example, the use of lookup tables to transform each component of the input data prior to the multidimensional transformation performed by the apparatus of the present invention can be provided.

What is claimed is:

1. An apparatus for transforming input data values into output data values in accordance with a non-linear transformation function producing an output variable which is a non-linear function of an input variable comprising:

an addressable database having a plurality of storage locations which store, in sequential address locations thereof, sequential output data values corresponding to values of said non-linear transformation function produced from a range of sequential input data values, differences between immediately successive ones of said sequential input data values for which said sequential output data values are stored in said sequential address locations of said addressable database varying over said range of input data values;

an output data value interpolator which is coupled to receive output data values supplied thereto from said addressable database and which is operative to generate an interpolated output data value, in accordance with an input data value and an interpolation control value supplied thereto; and an address and interpolation control value generator having an input to which said input data value is applied, a first, address output coupled to said addressable database and a second, interpolation control value output coupled to said output data value interpolator, and being operative, in response to said input data value supplied thereto, to generate address signals for accessing respective output data values stored in plural ones of storage locations of said addressable database and thereby causing said respective output data values to be coupled to said output data value interpolator, and an interpolation control value for application to said output data value interpolator.

2. An apparatus according to claim 1, wherein said address and interpolation control value generator comprises a first look-up table which outputs a base address value and a control value in accordance with a first prescribed portion of said input data value, a second look-up table which outputs an offset address value and said interpolation control value in accordance with a second prescribed portion of said input data value and said control value output by said first look-up table, and an address generator which is operative to generate said address signals for accessing respective output data values stored in plural ones of storage locations of said addressable database and thereby causing said respective output data values to be coupled to said output data value interpolator, in accordance with the base address value output by said first look-up table and the offset address value output by said second look-up table.

3. An apparatus according to claim 15, wherein said address generator is operative to generate said address signals in accordance with a combination of said base address value and said offset address value.

4. An apparatus according to claim 16, wherein said address generator is operative to generate said sequential address signals for accessing output data values stored in immediately sequential address locations of said database in accordance with a summation of said base address value and said offset address value.

5. An apparatus according to claim 14, wherein said sequential input data values for which output data values are stored in successive storage locations of said database comprise a distribution of input data values containing first input data values having first differences between immediately sequential ones thereof and second input data values having second differences between immediately sequential ones thereof, said second differences being greater than said first differences, and wherein the rate of change of the slope of said non-linear transformation function relative to said input variable is greater for said first input data values than said second input data values.

6. An apparatus according to claim 5, wherein said address and interpolation control value generator comprises a first look-up table which outputs a base address code, and a control code representative of one of said first and second differences, in accordance with a first prescribed portion of said input data value, a second look-up table which outputs an offset address code and said interpolation control code in accordance with a second prescribed portion of said input data value and said control code output by said first look-up table, and an address generator which is operative to generate said address signals for accessing respective output data values stored in plural ones of storage locations of said addressable database and thereby causing said respective output data values to be coupled to said output data value interpolator, in accordance with the base address code output by said first look-up table and the offset address code output by said second look-up table.

7. An apparatus according to claim 6, wherein said address generator is operative to generate said address signals in accordance with a sum of said base address code and said offset address code.

8. An apparatus according to claim 7, wherein said input data value comprises a multibit input data code and wherein said first prescribed portion of said multibit input data code corresponds to a prescribed number of most significant bits of said multibit input data code, and wherein said second prescribed portion of said multibit input data code corresponds to a prescribed number of least significant bits of said multibit input data code.

9. An apparatus according to claim 1, wherein said non-linear transformation function is operative to perform a non-linear transformation of color image data from a first multidimensional color coordinate space to a second multidimensional color coordinate space.

10. An apparatus according to claim 9, wherein said first multidimensional color coordinate space corresponds to an R,G,B color space and said second multidimensional color coordinate space corresponds to color space other than an R,G,B color space.

11. A method for transforming input data values into output data values in accordance with a non-linear transformation function, said non-linear transformation function producing an output variable which is a non-linear function of an input variable, comprising the steps of:

(a) storing, in sequentially addressable storage locations of an addressable database, sequential output data values respective ones of which correspond to values of said non-linear transformation function product from a range of sequential input data values, wherein immediately successive ones of said sequential input data values, for which said non-linear transformation function produces sequential output data values, have differences therebetween that vary over said range of input data values;

(b) generating an interpolation control value and address signals for accessing respective output data values stored in plural ones of storage locations of said addressable database;

(c) generating an interpolated output data value from output data values supplied from said addressable database in response to said address signals and in accordance with said interpolation control value supplied thereto in step (b).

12. A method according to claim 11, wherein step (b) comprises providing a first look-up table which outputs a base address value and a control value in accordance with a first prescribed portion of said input data value and a second look-up table which outputs an offset address value and said interpolation control value in accordance with a second prescribed portion of said input data value and said control value output by said first look-up table, and generating said address signals for accessing respective output data values stored in plural ones of storage locations of said addressable database and thereby causing said respective output data values to be accessed from said database, in accordance with the base address value output by said first look-up table and the offset address value output by said second look-up table.

13. A method according to claim 12, wherein step (b) comprises generating said address signals in accordance with a combination of said base address value and said offset address value.

14. A method according to claim 13, wherein step (b) comprises generating said sequential address signals for accessing output data values stored in immediately sequential address locations of said database in accordance with a summation of said base address value and said offset address value.

15. A method according to claim 11, wherein said sequential input data values for which output data values are stored in successive storage locations of said database comprise a distribution of input data values containing first input data values having first differences between immediately sequential ones thereof and second input data values having second differences between immediately sequential ones thereof, said second differences being greater than said first differences, and wherein the rate of change of the slope of said non-linear transformation function relative to said input variable is greater for said first input data values than said second input data values.

16. A method according to claim 15, wherein step (b) comprises providing a first look-up table which outputs a base address code, and a control code representative of one of said first and second differences, in accordance with a first prescribed portion of said input data value, providing a second look-up table which outputs an offset address code and said interpolation control code in accordance with a second prescribed portion of said input data value and said control code output by said first look-up table, and generating said address signals for accessing respective output data values stored in plural ones of storage locations of said addressable database and thereby causing said respective output data values to be output therefrom, in accordance with the base address code output by said first look-up table and the offset address code output by said second look-up table.

17. A method according to claim 16, wherein step (b) comprises generating said address signals in accordance with a sum of said base address code and said offset address code.

18. A method according to claim 17, wherein said input data value comprises a multibit input data code and wherein said first prescribed portion of said multibit input data code corresponds to a prescribed number of most significant bits of said multibit input data code, and wherein said second prescribed portion of said multibit input data code corresponds to a prescribed number of least significant bits of said multibit input data code.

19. A method according to claim 11, wherein said non-linear transformation function is operative to perform a non-linear transformation of color image data from a first multidimensional color coordinate space to a second multidimensional color coordinate space.

20. A method according to claim 19, wherein said first multidimensional color coordinate space corresponds to an R,G,B color space and said second multidimensional color coordinate space corresponds to a color space color space other than an R,G,B color space.

* * * * *

UNITED STATES PATENT AND TRADEMARK OFFICE
CERTIFICATE OF CORRECTION

PATENT NO. : 5,321,797
DATED : June 14, 1994
INVENTOR(S) : Roger R. A. Morton

It is certified that error appears in the above-indentified patent and that said Letters Patent is hereby corrected as shown below:

Claim 3, column 11, line 4, "15" should read -- 2 --;
Claim 4, column 11, line 8, "16" should read -- 3 --;
Claim 5, column 11, line 14, "14" should read -- 1 --.

Signed and Sealed this

Eighth Day of August, 1995

Attest:

BRUCE LEHMAN

Attesting Officer     Commissioner of Patents and Trademarks